Patented Sept. 26, 1933

1,927,916

UNITED STATES PATENT OFFICE 1,927,916

EMULSIFIED ALCOHOL PRODUCT AND METHOD OF MAKING THE SAME

Delbert F. Brown, Westfield, and Hugh C. De Hoff, Elizabeth, N. J., assignors to Standard Oil Development Company, a corporation of Delaware No Drawing. Application May 15, 1930
Serial No. 452,809

9 Claims. (Cl. 167—87)

This invention relates to emulsified products and the method of producing the same, and particularly to alcohol-oil emulsions prepared by means of a suitable emulsifying agent.

In the preparation of various emulsified compositions it is often desirable to incorporate a relatively high percentage of an alcohol. Alcohols, however, as is well known, are generally difficult to emulsify with oil, particularly mineral oil. In fact, alcohols are often used for breaking mineral oil emulsions.

We have discovered that alcohols can be easily emulsified with mineral oil in proportions varying from about 30% to about 50% of alcohol by the use of a suitable emulsifying agent. Many of the natural gums have this property and gum tragacanth, which, as is known, is obtained from a species of the Papilionaceæ family in the order of Leguminosæ, is particularly suitable for this purpose.

We have found for example that it is possible to prepare a more or less stable emulsion consisting of by weight—

| | Parts |
|---|---|
| Ethyl alcohol | 40 |
| Gum tragacanth | 1 |
| White mineral oil | 12 |
| Water | 43 |

The proportions of the various constituents in the above mentioned composition are susceptible of variation with fairly wide limits. For instance, the amount of alcohol may vary from small amounts, say 15% up to 50%, and the mineral oil may vary from 1% to 5% or more altho we have found that for most purposes the proportions given in the example stated above are most satisfactory. By white mineral oil is meant a highly purified heavy hydrocarbon preferably of a grade approaching or equaling petrolatum liquidum U. S. P.

We have found moreover that other materials may be substituted for the above constituents. For example normal propyl, isopropyl, secondary butyl or other alcohol may be substituted in part or wholly for the ethyl alcohol, vegetable and/or animal oils may be substituted in part or wholly for the mineral oil. Gum acacia, which, as is known, is obtained from a species of the Mimosaceæ family in the order of Leguminosæ, has been found to be suitable for use as the emulsifier in such compositions, altho in general it is not as satisfactory as gum tragacanth because of its lower emulsifying power, which necessitates the use of a larger quantity of the gum to effect permanent emulsions.

It will be understood that mixtures of oils and mixtures of alcohols may be used and are included when reference is made to oil and alcohol.

Compositions of this type are particularly suitable for use in applications to the skin or scalp. We have found the composition prepared in accordance with the formula given above to be a very satisfactory hair and skin lotion altho it may be desirable to incorporate other materials therein for certain specific uses.

For example, we have found that quinine, salicylic acid, or other compounds having antiseptic or stimulative properties, may be advantageously incorporated in the composition for use as a hair tonic. The aqueous extract of quince seed, commonly known as quince mucilage, glycerine or other compounds having healing, soothing or like properties, may be incorporated in our composition for use as a skin lotion. Our composition may even be converted into a semi-solid salve-like preparation by the incorporation therein of solids such as zinc oxide, calcium carbonate, or the like. In fact, any beneficial material which is soluble in any of the constituents of our composition and is not precipitated out by the other constituents, or any solid or such precipitate as may be suspended in the emulsion during preparation of the latter so as to remain more or less permanently suspended therein, may be incorporated in our composition according to the specific use which it is desired to make of the final product.

In preparing our emulsion we have found that it is necessary to incorporate the emulsifier with water and alcohol and thoroughly stir or beat this mixture before adding the oil and any other constituents that are to be added. Thus in the example given above the tragacanth is swelled in the water and thoroughly beaten in a stirring machine. The alcohol is then added slowly with continued stirring. If alcohol soluble additions are to be incorporated in the final composition they are dissolved in the alcohol and added slowly with continued stirring. When the alcohol, or alcohol solution of other constituents if such are to be incorporated, has all been added, the oil, together with oil soluble constituents if such are to be included, is added slowly with continued stirring or beating.

It will be seen that our composition is capable of application to a wide variety of uses and while we have described with particularity our composition with respect to certain details it will be understood that we contemplate all such modifications and applications as come within the scope of our invention as defined by the appended claims.

We claim:—

1. An emulsified product, comprising substantially more than 15% of an alcohol, an oil and water, containing an emulsifying agent comprising gum having emulsifying properties corresponding to those of gums obtained from plants belonging to the order of Leguminosæ.

2. A product according to claim 1, containing an emulsifier of the class comprising gum tragacanth and gum acacia.

3. A product according to claim 1, in which the alcohol is an aliphatic monohydric alcohol.

4. An emulsified product comprising 30-50% of an alcohol, 1-20% of an oil and 0.1-5% of gum tragacanth.

5. A composition especially adapted for application to the skin or scalp comprising 30-50% of an alcohol, 1-20% of an oil, 0.1-5% of gum tragacanth and medicaments which increase the healing, soothing and antiseptic properties of the composition.

6. A composition according to claim 5, in which the alcohol is a member of the class comprising lower members of the series of monohydric aliphatic alcohols, and the oil is a member of the class comprising refined white mineral oil, refined vegetable oil and refined animal oil.

7. Method of preparing an emulsion containing more than 15% of an alcohol, oil, an emulsifying agent and water, the oil being less in amount than the alcohol, comprising incorporating the emulsifier with water and alcohol, agitating and then adding the oil with continued agitation.

8. Method according to claim 7, in which any desired oil soluble, water soluble and alcohol soluble constituents capable of imparting additional specific properties to the final product are dissolved in their respective solvents prior to the incorporation of said solvents into the emulsified product.

9. Method according to claim 7, in which are used 30-50% of an alcohol of the class comprising the lower members of the series of aliphatic monohydric alcohols, 1-20% of a refined oil of the class comprising white mineral oil, vegetable oil, and animal oil, and 0.1-5% of gum tragacanth.

DELBERT F. BROWN.
HUGH C. DE HOFF.